Patented July 21, 1931

1,815,464

UNITED STATES PATENT OFFICE

FRANK A. FAHRENWALD, OF CHICAGO, ILLINOIS, ASSIGNOR TO AMERICAN MANGANESE STEEL COMPANY, OF CHICAGO HEIGHTS, ILLINOIS, A CORPORATION OF MAINE

WELDING ROD

No Drawing.   Application filed January 9, 1929. Serial No. 331,396.

This invention relates to alloys and has for its particular objects the provision of a welding rod for manganese steel; the provision of a welding rod whereby manganese steel castings can be welded by comparatively unskilled workmen; the provision of an alloy which when melted in air and applied to ferrous metal articles, whether manganese steel or otherwise, shall exhibit the essential characteristics of manganese steel; the provision of an alloy which, without heat-treatment, shall exhibit the toughness and abrasion resistance characteristic of heat-treated manganese steel; while further objects and advantages of the invention will become apparent as the description proceeds.

Manganese steel is a well known alloy, and its composition ordinarily falls within the following limits:

| | |
|---|---|
| Manganese | 10% to 14% |
| Carbon | 1% to 1.4% |
| Silicon | .30% to .60% |
| Phosphorus | .06% to .08% |
| Sulphur | .06% to .08% |
| Iron | Balance to make 100% |

The value of manganese steel is due primarily to its very great toughness and resistance to abrasion, but these qualities are ordinarily developed only as a result of heat treatment. If a casting of any composition falling within the above named limits be cooled slowly it becomes so brittle and weak as to have little if any value, but if cooled so quickly as to prevent internal transformation it exhibits a very high degree of toughness and wear resistance unless and until it is again heated above the transformation temperature, which is somewhere between 1700° F. and 1800° F.

This peculiarity has rendered it impossible heretofore to weld broken castings together successfully. If common steel were used for the weld metal the added material is deficient in strength, wear resistance, and corrosion resistance; if manganese steel welding rod of the usual composition be used the result is even worse in most respects since the slow cooling due to the shielded position such a weld ordinarily occupies enables a complete transformation of the internal structure and causes it to become so brittle that it often breaks merely due to cooling strains and always if subjected to loads or shocks. Furthermore if an attempt be made to weld manganese steel castings with manganese steel rod of the same composition the high temperature employed and the difficulties encountered generally cause the adjacent parts to become overheated and so lose their virtue. Also the plain manganese steel welding rod is extremely hard to manage due to the oxidizability of manganese which necessitates careful and thorough fluxing and exact regulation of the torch; if a reducing flame is used carbon is absorbed and the weld becomes fatally brittle; if an oxidizing flame is used the metal bubbles and swells, and becomes intermixed with oxide films. These same difficulties are encountered with electric welding. As a result even the most experienced welders generally get the adjacent parts so hot during their attempts that their temper is drawn from the surrounding casting which because of its bulk cools slowly and loses its valuable character.

I have discovered that if nickle or cobalt be alloyed with the ingredients of the welding rod all these difficulties can be diminished or even wholly overcome. The limits of composition are about:

| | |
|---|---|
| Ferrous metal | 90% to 25 % |
| Manganese | 5% to 25 % |
| Carbon | 0.5% to 2. % |
| Non-ferrous iron group metals (i. e. Ni or Co | .25% to 50 % |

It will be noted by comparing the above formula with that given for maganese steel that the limits of composition are broader in all directions, and such is, in fact, the case. In the presence of nickel or cobalt it becomes possible to expand the limits of both carbon and manganese in both directions, and steel retains the valuable properties of manganese steel, and indeed increase the same in respect of strength, toughness, wear resistance, and shock resistance.

Unless iron be present to around at least about 25% the material is not sufficiently hard and wear resistant and does not exhibit peen-hardness to a sufficient extent. If iron constitutes as much as 90% of the alloy it is desirable to have at least about 1% of nickel to retain sufficient toughness and shock resistance; though the alloy will be deficient in wear resistance for some purposes. Carbon should not exceed the usual limits of 1% to 1.4% unless more than 1% of nickel (or cobalt) is present since either more or less carbon tends to embrittle; although in the presence of enough nickel (or cobalt) not only can more carbon be present, but the proportion of silicon can be increased. Also the tendency of the molten alloy to absorb carbon from a flame or oxygen from the air is greatly diminished.

A few specimen formulas are as follows:

|  | F | G |  | A | B | C | D | E |
|---|---|---|---|---|---|---|---|---|
| ferrous metal | 30 | 85% |  | 79.35 | 86.25 | 83.25 | 73.25 | 58.5 |
| manganese | 18 | 12.50% |  | 14. | 10 | 5 | 15 | 20 |
| carbon | .5 | 1.% |  | 1.3 | 1. | 1.25 | 1.25 | .5 |
| (non-ferrous iron group metal) | 50 | 1.% |  | 5. | .75 | 10 | .0 | 20 |
| (silicon impurity) | 1.5 | .50% |  | 0.35 | 2.00 | .50 | .50 | 1.00 |

(N. B. The odd decimal value for the ferrous metal is not significant but is due solely to its derivation by difference from 100. A variation of 10% in any ingredient of any formula is permissible.)

Formula A is my present preference combining maximum chemical and physical properties with inexpensive composition, and suitable for the largest possible range of requirements. Formula B is an example of an inexpensive composition, high in iron, not so satisfactory as Formula A, but adequate for many purposes. Formula C represents greater chemical stability but not so great physical strength. Formula D represents great physical strength combined with high chemical resistance. Formulas E and F represent the extremes of chemical stability with some sacrificing strength and wear resistance.

I prefer for reasons of economy to use nickel instead of cobalt, and when cobalt is employed I prefer to reduce its proportion somewhat both because of its greater cost and because of its greater hardening effect, but in an alloy for welding rods expense is of minor importance, compared with the ability to reclaim large and valuable articles.

A further advantage of my improved weld metal is that it can be applied or built up in situ where desirable so as to produce a wearing layer upon an existing article, not only of manganese steel but of other material, or to replace the contour of a worn article. Thus a steel switch point or crossing can be surfaced merely with a blow torch or electric welding outfit and a strip of my improved alloy, not only saving the cost of a new part but saving the cost and annoyance of replacement and making the article better than it was originally.

The presence of the nickel (or cobalt) enables the addition of other metals soluble in nickel but not beneficial to manganese steel in the absence of nickel. Among these metals are copper, vanadium, and the chromium group metals, viz: chromium, tungsten, and molybdenum.

It will be observed that many of the compositions I have described are considerably more expensive than manganese steel, but I do not consider this a substantial drawback when it is considered that by the use of a few ounces of the more expensive alloy it becomes possible to save castings of much greater weight, or make a wear resisting coating on a mass of cheaper metal. It is for the same reason that cobalt becomes practical to use though ordinarily barred by reason of its price.

In describing or claiming this invention as a welding rod, however, I do not limit myself to any particular shape or form but employ that term to designate any sort of rod wire, ingot, strip, or mass of the alloy capable of being melted and cast or otherwise applied by the use of heat. Viewed from the scientific aspect, manganese steel in its tough and wear resisting condition is austenitic and possesses the gamma iron type of crystalline structure, is practically non-magnetic and holds its carbon content in uniform solid solution. This gamma iron, however, is stable only at elevated temperatures and tends at ordinary temperatures to change over into alpha iron which is magnetic, brittle, and has no dissolving power for carbon. As the alloy cools this change in the iron can occur only within a certain temperature range, below which it becomes so "set" that no change can occur. The essential heat treatment of manganese steel consists in cooling the material so quickly through this critical range that this change cannot occur. I have discovered that the presence of nickel or cobalt inhibits this change, in small amounts only partially, in larger amounts completely.

The presence of the nickel (or cobalt) serves to diminish or wholly eliminate the use of a flux, overcomes the tendency of the manganese to oxidize or carbonize even when present to only a fractional percentage, and prevents the embrittlement on slow cooling, and enables the production even by a comparatively unskilled workman of a weld which is hard, tough, and free from flaws; or a hard wear resisting surface on a base of less resistant metal; or the production of a casting which exhibits the characteristic properties of manganese steel without heat treatment. Accordingly my invention exhibits considerable latitude of use as well as of composition and I do not limit myself in any wise except as specifically recited in the annexed claims which I desire may be construed broadly, each independently of limitations contained in other claims.

Having thus described my invention what I claim is:

1. A welding rod or strip consisting essentially of a ternary alloy of iron, manganese and a non-ferrous iron group metal wherein the iron is present between the limits of 25% and 90%, the manganese between the limits of 5% and 25%, the non-ferrous iron group metal between .25% and 50%.

2. A welding rod or strip containing iron between about 25% and 86% and manganese between about 10% and 20% characterized by the presence of an amount of a non-ferrous iron group metal between about .25% and 20%.

3. A welding rod or strip containing manganese between about 10% and 20%, iron between about 60% and about 85%, carbon between about .5% and 2% and nickel between about 1% and 10%.

4. A welding rod containing iron between about 60% and about 80%, manganese between about 10% and 15%, nickel between 1% and 10% and carbon between .5% and 1.5%.

In testimony whereof I hereunto affix my signature.

FRANK A. FAHRENWALD.